United States Patent [19]
Fu et al.

[11] Patent Number: 5,512,521
[45] Date of Patent: Apr. 30, 1996

[54] COBALT-FREE, BLACK, DUAL PURPOSE PORCELAIN ENAMEL GLASS

[75] Inventors: Dechun Fu, Columbia; Vernon J. Grebe, Baltimore, both of Md.

[73] Assignee: Bayer Corporation, Pittsburgh, Pa.

[21] Appl. No.: 401,597

[22] Filed: Mar. 9, 1995

[51] Int. Cl.$^6$ .............................. C03C 3/085; C03C 8/02
[52] U.S. Cl. ................................ 501/65; 501/69; 501/21; 427/475
[58] Field of Search ................... 501/21, 24, 25, 501/58, 65, 66, 69, 71; 427/475

[56] References Cited

U.S. PATENT DOCUMENTS

| 5,198,393 | 3/1993 | Grebe et al. | 501/21 X |
| 5,296,415 | 3/1994 | Podestá | 501/21 X |

FOREIGN PATENT DOCUMENTS

| 0958357 | 9/1982 | U.S.S.R. | 501/21 |
| 1014807 | 4/1983 | U.S.S.R. | |
| 1265160 | 10/1986 | U.S.S.R. | |

OTHER PUBLICATIONS

Kruchinin et al. ("Effect of Iron oxides on the structure and properties of sodium borosilicate enamels", Glass & Ceramics, pp. 364–367 (Translated from Steklo i Keramiks, No. 9, pp. 23—23, Sep. 1990, Plenum, New York).

*Primary Examiner*—Karl Group
*Attorney, Agent, or Firm*—Joseph C. Gil; Aron Preis

[57] ABSTRACT

A borosilicate glass composition suitable for porcelain enamel applications is disclosed. Accordingly, a black, cobalt-free composition which contains a significant amount of iron oxide was found to be suitable for enameling cast iron and non-pickled steel substrates. The inventive glass is suitable for applications requiring black color, acid resistance, thermal durability and water vapor resistance. In particular, the inventive glass can be used both as a ground coat and a cover coat.

8 Claims, No Drawings

COBALT-FREE, BLACK, DUAL PURPOSE PORCELAIN ENAMEL GLASS

FIELD OF THE INVENTION

The present invention relates to glass compositions suitable for porcelain enamel application, and more particularly to black borosilicate compositions which are free of cobalt.

SUMMARY OF THE INVENTION

A borosilicate glass composition suitable for porcelain enamel applications is disclosed. Accordingly, a black, cobalt-free composition which contains a significant amount of iron oxide was found to be suitable for enameling cast iron and non-pickled steel substrates. The inventive glass is suitable for applications requiring black color, acid resistance, thermal durability and water vapor resistance. In particular, the inventive glass can be used both as a ground coat and a cover coat.

BACKGROUND OF THE INVENTION

Porcelain enamels are the coatings of choice for various metal substrates including cast iron, steel, and aluminum. These enamels in the form of wet slips or dry powders are applied to metallic substrates which are then subject to high temperature firing to provide a smooth porcelain enamel coating. Depending on the specific requirements for certain applications, porcelain enamels can protect metal substrates from corrosion, oxidation, and abrasion. They can also form an aesthetically appealing surface on the metal substrate to provide desirable color, gloss, and unique surface texture.

Traditionally, porcelain enamels have been divided into ground coats and cover coats. A ground coat serves as an intermediate layer, providing a bond between the base metal substrate and the cover coat. A cover coat is designed to provide color and surface characteristics that are combined with other required physical properties such as resistance to corrosion, abrasion, and thermal shock.

It is highly desirable to combine the functionalities of both ground coat and cover coat into one single coat. In particular, black color dual purpose porcelain enamel glasses are in demand for enameling non-pickled steels. These dual purpose enamel glasses which are typically applied by the well known electrostatic powder spraying technique, simplify the processing requirements, minimize waste generation, and reduce production cost.

To produce black color dual purpose electrostatic powders, cobalt-bearing glasses are normally used. Cobalt oxide (CoO), as well as nickel oxide (NiO), is considered as a necessary promoter of adherence between glass and steel. Cobalt oxide is also a colorant for black glasses. The art has long recognized that iron oxide ($Fe_2O_3$), among other transition metal oxides such as copper oxide (CuO) and manganese oxide ($MnO_2$) may be used in enamel compositions to impart various shades of color to the enamel. Normally these transition metal oxides are used at levels below 3 wt %. Higher concentration would lead to crystallization upon the firing of the enamel.

Cobalt-free enamel glasses were developed in response to the critical shortage of cobalt raw materials in the world market in the 1970's. Typically, such cobalt-free glass compositions were formulated by substituting all the CoO in a cobalt-bearing composition with NiO. In these compositions, the ratio of alkali ($Li_2O:Na_2O:K_2O$) is also adjusted to attain proper viscosity of the enamel at the firing temperature.

Current commercial cobalt-free enamels are cheaper substitutes for cobalt-bearing glasses in general purpose ground coats whose primary function is to provide good adherence to the metal substrate. Their applications are limited in many cases because of the lack of color stability, thermal durability and acid resistance. To expand the applicability of cobalt-free enamel glasses, it is necessary to make them darker, to impart greater color and thermal stability and to improve their resistance to acid.

The effect of iron oxide on the darkening of enamel color has been studied: as the iron content increases, the reflectance of the glass continuously decreases, reaching a value comparable to that which is obtainable with typical cobalt-bearing compositions. Iron oxide, which is often considered as an undesirable discoloring impurity component in glasses, can function both as a glass network former and a network modifier. It was also reported by Kruchinin et al. ("Effect of iron oxides on the structure and properties of sodium borosilicate enamels", Glass & Ceramics, pp 364–367 (Translated from Steklo i Keramika, No. 9, pp 23–24, September, 1990, Plenum, New York) that iron oxide has a positive effect on the properties of multi-component sodium borosilicate enamel coatings in reducing the firing temperature, and increasing the impact strength, wear resistance, and acid resistance.

The use of iron oxide in enamels has been disclosed in several Russian patents. The compositions thus disclosed are unlike the present invention and are suitable only for wet systems where the desirable acid and water resistance and thermal durability are imparted by adding clays and refractory mill additions. In electrostatic powder application, however, such desirable properties have to be built-in within the enamels since mill additives cannot be used for reasons of encapsulation.

Russian Patent 1,014,807 disclosed cobalt-bearing flits. Russian Patent 1,265,160 disclosed frits lacking acid resistance and thermal durability. The composition contains 35–49% $SiO_2$, 14–18% $B_2O_3$, 2–5% $Al_2O_3$, 1.5–5% $CaF_2$, 2–4% $K_2O$, 15.6–20% $Na_2O$, 0.4–0.6% CuO, 9–12% $Fe_2O_3$, 1.4–1.6% NiO, and 0.9–1.1% MnO. Russian Patent 1,470,685 disclosed frits containing 0.1–2% $Cr_2O_3$ and 0.1–1% $Mo_2O_5$. The frit composition also contains 29–35% $SiC_2$, 12–16% $B_2O_3$, 8–12% $Al_2O_3$, 20–24% $Na_2O$, 1.7–6% $Fe_2O_3$, 1–3% NiO, 3–9% $CaF_2$, and 0.1–1% CuO. Russian Patent 1,609,756 disclosed frits containing 2.3–4.1% $Cr_2O_3$, 6.8–12% ZnO, and 0.1–1% $MoO_3$. The composition also contains 28–36% $SiO_2$, 1.5–4% $TiO_2$, 14–18% $B_2O_3$, 1–4% $Al_2O_3$, 4–8.55 $P_2O_5$, 15–20% $Na_2O$, 2.5–5% $Fe_2O_3$, 1–3% NiO, 3.–9% $CaF_2$, and 0.1–1% CuO.

DETAILED DESCRIPTION OF THE INVENTION

The present invention resides in the findings that dual purpose black electrostatic powders can be made from cobalt-free porcelain enamel glasses. These black glasses exhibit good acid resistance, thermal durability, and water vapor resistance. It was found that the glass transition temperature decreases as the content of iron oxide in the enamel increases. It was further found that the similarity between iron oxide and boron oxide with respect to glass structure makes them competing components in glass forming. With increased iron oxide content, the boron content in the glass can be reduced while reasonable firing temperature of the enamel is maintained. This makes the cobalt-free composition even more attractive economically since the raw material source of iron oxide is more economical than that of boron oxide. It is also noted that with increasing iron oxide content the glass shows a higher tendency towards devitrification on firing.

The glass of the present invention may be applied by any of the well known methods, in particular, electrostatic dry powder spraying. The electrostatic powder is prepared according to the procedure described in U.S. Pat. No. 3,930,062 (A. I. Nedljkovic, "Composition and method for electrostatic deposition of dry porcelain enamel frit", Dec. 30, 1975) the disclosure of which is incorporated herein by reference and U.S. Pat. No. 4,265,929 (G. Wagner and W. Joseph, "single-bake two-layer enameling with electrostatic coating", May 5, 1981 ), the disclosure of which is incorporated herein by reference.

The black color, cobalt-free, dual purpose enamel glass in accordance with the present invention is characterized in that it contains a relatively high amount, about 6.6 to 10.5 percent, of iron oxide (except where noted, the percentages noted in the present text are percent by weight) as both a colorant and promoter of glass-to-steel adherence. The glass also contains 2.2 to 4.4 percent of nickel oxide for complementing these functions of the iron oxide.

Other transition metal oxides such as CuO and $MnO_2$ may also be used for color tuning, but such are not critical for the purpose of providing bond to metal substrate or for darkening the color of the enamel. Excessive use of $MnO_2$ can cause the formation of undesirable crystals. Optionally, the composition may contain up to 4.2 percent CaO, up to 1.2 percent $P_2O_5$, up to 3.6 percent $TiO_2$, and up to 1.6 percent $Al_2O_3$.

The composition is further characterized in that it contains about 9 to 13.5 percent $Na_2O$, 0.5 to 14.2 percent $K_2O$, and may optionally contain up to 1.8 percent $Li_2O$, with the proviso that the total of $Na_2O$+ $Li_2O$+$K_2O$ is about 13.9 to 25.3 percent. The composition further contains $B_2O_3$ at an amount of 6.6 to 14.8 percent. Up to 1 percent fluorine can be used as additional flux.

The chemical composition of the inventive porcelain enamel glass may be described as:

| | |
|---|---|
| $Na_2O$ | 9–13.5 |
| $K_2O$ | 0.5–14.2 |
| $B_2O_3$ | 6.6–14.8 |
| $Fe_2O_3$ | 6.6–10.5 |
| $SiO_2$ | 49.1–56.2 |
| NiO | 2.4–4.4 | with the optional presence of the following in the noted amounts:

| | |
|---|---|
| $Li_2O$ | 0–1.8 |
| $Al_2O_3$ | 0–1.6 |
| $P_2O_5$ | 0–1.2 |
| $TiO_2$ | 0–3.6 |
| CuO | 0–2.3 |
| $MnO_2$ | 0–0.4 |
| CaO | 0–4.2 |
| F | 0–1 | with the proviso that the total of $Li_2O$+$Na_2O$+$K_2O$ is 13.9–25.3.

In a preferred embodiment, the cobalt-free, black porcelain enamel of the invention is further characterized in that its color, determined as described below, has a CIELab "L" value of about 4 to 10, "a" value of about— 0.5 to 2.1 and "b" value of about 0 to 3.5.

The raw material useful as sources for the oxides of the inventive glasses are well known to those skilled in that art. Also, the preparation of the composition of the invention follows conventional procedures which too are well known.

The invention is further illustrated but is not intended to be limited by the following examples in which all parts and percentages are by weight unless otherwise specified.

EXAMPLES

Glasses in accordance with the invention have been prepared and their properties evaluated as summarized in Table 1 below.

The enamel glasses compositions were applied to metal substrate by electrostatic powder spraying technique.

In preparing the specimens used in evaluating the glass of the invention, use was made of decarbonized enameling steel panels (Q-Panel, OH) with dimensions of 4 by 6 inches. These were sprayed with approximately 5 grams of powder when only one coat was involved, or 1 gram of ground coat powder and 5 grams of cover coat powder when two coats were involved. These panels were fired in an electric box furnace at temperatures ranging from 804° C. to 849° C. for 3 minutes without a backup panel (hot point fire) or 10 minutes with a ¼ inch thick cast iron backup panel (cold point fire). The backup panel was to simulate the slow heating used in the production process.

The color of the enamel coating was determined by reading a fired panel (fired at 800° C. to 850° C.) on a computer aided Spectrophotometer (Pacific Scientific Co., Instrument Div., Md.). The instrument was set with an illuminant of type C, a 2 degree observer angle.

The glass-to-steel adherence was determined with the aid of a drop weight method described in the Porcelain Enamel Institute (PEI) Bulletin T-17 and rated using a scale 1–5 with class 5 being the best.

The acid resistance was evaluated according to a standard procedure described in PEI bulletin T-21 with "A" denoting the best performance in a scale of A to D.

Electrostatic powder was prepared by ball milling frit 1 in Table 1. Several panels were sprayed and fired according to the procedure described above.

TABLE 1

| Frit # | 1 | 2 | 3 | 4 | 5 | 6 | 7 | 8 | 9 |
|---|---|---|---|---|---|---|---|---|---|
| $Li_2O$ | | 1.8 | 0.5 | 0.5 | | 1.4 | 1.3 | | |
| $Na_2O$ | 9.2 | 9.3 | 13.4 | 13.5 | 13.4 | 9.3 | 9 | 9.2 | 9.1 |
| $K_2O$ | 14 | 14.2 | 1.9 | 0.5 | 0.5 | 13.5 | 13.7 | 13.9 | 13.8 |
| CaO | | | 3.4 | 3.3 | 4.2 | | | | |
| $Al_2O_3$ | | | | | | 1.6 | | | |
| $B_2O_3$ | 12.5 | 6.7 | 14.6 | 14.8 | 14.7 | 6.8 | 6.6 | 12.5 | 12.3 |
| $P_2O_5$ | | 1.2 | | | | 1.2 | 1.2 | | |

TABLE 1-continued

| Frit # | 1 | 2 | 3 | 4 | 5 | 6 | 7 | 8 | 9 |
|---|---|---|---|---|---|---|---|---|---|
| SiO$_2$ | 50 | 52.4 | 55.1 | 56.2 | 56 | 51 | 51.2 | 50.7 | 49.1 |
| TiO$_2$ | 2.3 | 2.5 | | | | 2.5 | 3.6 | 2.3 | 2.3 |
| F | | | 1 | 1 | 1 | | | | |
| NiO | 4.4 | 3.4 | 2.4 | 2.5 | 2.5 | 3.5 | 2.8 | 4.4 | 4.3 |
| MnO$_2$ | | | 0.4 | | | | | | |
| CuO | 0.6 | | 0.6 | 1 | 1 | | | 1.1 | 2.3 |
| Fe$_2$O$_3$ | 6.9 | 8.3 | 6.6 | 6.6 | 6.6 | 9.6 | 10.5 | 6.9 | 6.8 |
| 3 min. 827° C. | | | | | | | | | |
| L | 5.97 | 6.5 | 8.86 | 7.89 | 7.5 | 7.09 | 6.2 | 5.58 | 6.82 |
| a | 0.91 | 2.1 | 0.01 | 0.12 | 0.43 | 1.6 | 1.6 | 0.42 | 0.46 |
| b | 1.18 | 3 | 3.09 | 2.59 | 3.2 | 3.1 | 2.9 | 0.92 | 1.94 |
| Bond Strength | 4 | 3 | 5 | 5 | 5 | 4+ | 3+ | 5 | 5 |
| Acid Resist. | A | A | A | A | A | B+ | B+ | A | A |

The color readings as function of firing temperature, application weight, and re-coat/re-fire processing in are summarized in Table 2.

TABLE 2

| Temperature Spread | | | |
|---|---|---|---|
| Temperature °C. | 804 | 827 | 849 |
| 3 min hot point | | | |
| L | 5.88 | 5.97 | 5.63 |
| a | 0.83 | 0.91 | 1.26 |
| b | 0.74 | 1.18 | 1.95 |
| Bond | 4 | 4 | 5 |
| Acid Resistance | A | A | A |
| 10 min cold point | | | |
| L | | 6.06 | 5.64 |
| a | | 1.17 | 1.01 |
| b | | 1.73 | 1.42 |
| Bond | | 5 | 5 |
| Acid Resistance | | A | A |
| Application Spread | | | | |
| Weight in Grams | 3 | 5 | 7 | 9 |
| L | 11.36 | 6.67 | 5.69 | 3.96 |
| a | 0.05 | 0.63 | 0.64 | 0.51 |
| b | 3.92 | 1.99 | 0.73 | 0.63 |
| Bond | 5 | 5 | 4 | 4 |
| Acid Resistance | A | A | A | A |
| Re-Coat/Re-Fire | | | |
| 1st Coat Weight in Grams | | 3 | 5 |
| 2nd Coat Weight in Grams | | 5 | 3 |
| Initial Color | | | |
| L | | 11.36 | 6.67 |
| a | | 0.05 | 0.63 |
| b | | 3.92 | 1.99 |
| Refire Color | | | |
| L | | 4.32 | 3.69 |
| a | | 0.47 | 0.39 |
| b | | 0.75 | 0.70 |

Data in Table 2 show that the inventive glass is suitable for use as an acid resistant black enamel. The variations of L, a, and b values in the selected temperature range are comparable to that of most cobalt-bearing black frits. The color stability is acceptable for typical enameling applications. This enamel also becomes darker and bluer with little change in its redness as the application weight (grams of powder deposited on a 4" by 6" panel) increases. This change is more desirable than that prevailing in the currently available cobalt-bearing enamels.

Two-coat/one-fire panels were made using the powder made of frit 1 as a ground coat and a commercial white powder, the composition of which is not critical to the findings reported here, as a cover coat. The fired panels were inspected and appear to be smooth, glossy, and free of surface defects. The bond was deemed excellent throughout the studied temperature range. The results of the evaluation are summarized in Table 3.

TABLE 3

| Two-Coat/One Fire Application | | | | |
|---|---|---|---|---|
| Temp °C. | L | a | b | Bond |
| 815 | 89.03 | −0.83 | −1.82 | 5 |
| 827 | 88.84 | −0.88 | −1.59 | 5 |
| 838 | 88.50 | −0.90 | −1.42 | 5 |

It is well known that the moisture in a porcelain enamel production furnace contributes to the absorption of hydrogen in the steel microstructure. As the solubility of hydrogen decreases at lower temperatures, hydrogen atoms combine to form hydrogen gases which escape as the steel is cooled from the firing temperature. This outgassing process often leads to surface defects in enamel coating if the viscosity of the glass is not optimized. Good water vapor resistance is thus essential for enamels that are fired in a high moisture environment, i.e. a furnace where parts prepared by wet application methods (spraying, dipping, and flow coating) are fired.

In testing the water vapor resistance of an enamel, panels with dimensions of 4 by 6 inches were sprayed with 5 grams powder made from frit 2 of Table 1 on the front side and 3 grams powder on the back side. The panels were then fired at 827° C. for 3 minutes in a box furnace with a predetermined amount of water introduced. A cobalt-bearing enamel known for excellent water vapor resistance is fired simultaneously as a reference. The results are summarized in Table 4.

The results show that the inventive enamel is better than the reference material at a high moisture environment.

TABLE 4

| Results of water vapor resistance test | | |
|---|---|---|
| Water | Cobalt-Bearing Enamel | Cobalt-Free Enamel |
| 10 cc | Excellent | Excellent |
| 15 cc | Excellent | Excellent |

TABLE 4-continued

Results of water vapor resistance test

| Water | Cobalt-Bearing Enamel | Cobalt-Free Enamel |
|---|---|---|
| 20 cc | Good | Excellent |

A 4"×6" panel of extra low carbon steel was sprayed with electrostatic powder made by ball milling frit 3 of Table 1. This panel was fired at 827° C. for 3 minutes. This panel was determined to have class 5 bond, a high gloss surface, and was free of defects.

The thermal durability of this panel was evaluated using an accelerated test developed in-house. Accordingly, the test panel coated with a cobalt-bearing enamel which is known to have good pyrolytic property. The test panels were placed into a convection oven set at 620° C. After 18 hours, the panels were removed from the oven and examined visually for defects (iron penetration, copperheads, and loss of gloss). The cobalt-free enamel was determined to be comparable in terms of thermal durability to the cobalt-bearing enamel and to exhibit better bond than the cobalt-bearing enamel.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cobalt-free, black procelain enamel glass frit composition comprising

| | |
|---|---|
| $Na_2O$ | 9–13.5 |
| $K_2O$ | 0.5–14.2 |
| $B_2O_3$ | 6.6–14.8 |
| $Fe_2O_3$ | 6.6–10.5 |
| $SiO_2$ | 49.1–56.2 |
| NiO | 2.4–4.4 |
| $Li_2O$ | 0–1.8 | with the proviso that the total of $Li_2O+Na_2O+K_2O$ is 13.9–25.3, said glass frit prepared by (i) melting a mixture of raw materials to form a molten mixture and (ii) quenching said molten mixture, said enamel 2. The composition of claim 1 further containing at least one member selected from the group consisting of 0.14 1.6% $Al_2O_3$, 0–1.2% $P_2O_5$, 0–3.6% $TiO_2$, 0–2.3% CuO, 0–0.4% $MnO_2$, 0–4.2% CaO, and 0–1% F.

3. A cobalt-free, black porcelain enamel glass frit composition comprising

| | |
|---|---|
| $Na_2O$ | 9–13.5 |
| $K_2O$ | 0.5–14.2 |
| $B_2O_3$ | 6.6–14.8 |
| $Fe_2O_3$ | 6.6–10.5 |
| $SiO_2$ | 49.1–56.2 |
| NiO | 2.4–4.4 |
| $Li_2O$ | 0–1.8 | with the proviso that the total of $Li_2O+Na_2O+K_2O$ is 13.9–25.3, said glass frit prepared by (i) melting a mixture of raw materials to form a molten mixture and (ii) quenching said molten mixture, said enamel having a CIELab "L" value of about 4 to 10, "a" value of about −0.5 to 2.1, and "b" value of about 0 to 3.5 as determined by spectrophotometry, illuminant type C, and a 2 degree observer angle, of a panel fired at 800° C. to 850° C.

4. The composition of claim 3 further containing at least one member selected from the group consisting of 0–1.6% $Al_2O_3$, 0–1.2% $P_2O_5$, 0–3.6% $TiO_2$, 0–2.3% CuO, 0–0.4% $MnO_2$, 0–4.2% CaO, and 0–1% F.

5. A method of using the cobalt-free, black porcelain enamel glass frit composition containing

| | |
|---|---|
| $Na_2O$ | 9–13.5 |
| $K_2O$ | 0.5–14.2 |
| $B_2O_3$ | 6.6–14.8 |
| $Fe_2O_3$ | 6.6–10.5 |
| $SiO_2$ | 49.1–56.2 |
| NiO | 2.4–4.4 |
| $Li_2O$ | 0–1.8 | with the proviso that the total of $Li_2O+Na_2O+K_2O$ is 13.9–25.3, said glass frit prepared by (i) melting a mixture of raw materials to form a molten mixture and (ii) quenching said molten mixture, said method comprising applying said composition to the surface of a non-pickled steel.

6. The method of claim 5 wherein said composition in the form of electrostatic powder is applied by electrostatic dry powder spraying.

7. A method of using the cobalt-free, black porcelain enamel glass frit composition containing

| | |
|---|---|
| $Na_2O$ | 9–13.5 |
| $K_2O$ | 0.5–14.2 |
| $B_2O_3$ | 6.6–14.8 |
| $Fe_2O_3$ | 6.6–10.5 |
| $SiO_2$ | 49.1–56.2 |
| NiO | 2.4–4.4 |
| $Li_2O$ | 0–1.8 | with the proviso that the total of $Li_2O+Na_2O+K_2O$ is 13.9–25.3, said glass frit prepared by (i) melting a mixture of raw materials to form a molten mixture and (ii) quenching said molten mixture, said enamel having a CIELab "L" value of about 4 to 10, "a" value of about −0.5 to 2.1, and "b" value of about 0 to 3.5 as determined by spectrophotometry, illuminant type C, a 2 degree observer angle and a large area opening, said method comprising applying said composition to the surface of a non-pickled steel.

8. The method of claim 7 wherein said composition in the form of electrostatic powder is applied by electrostatic dry powder spraying.

* * * * *